Feb. 15, 1955  A. MAESCHER  2,701,911
HAND FABRIC CUTTING APPARATUS
Filed Nov. 20, 1952
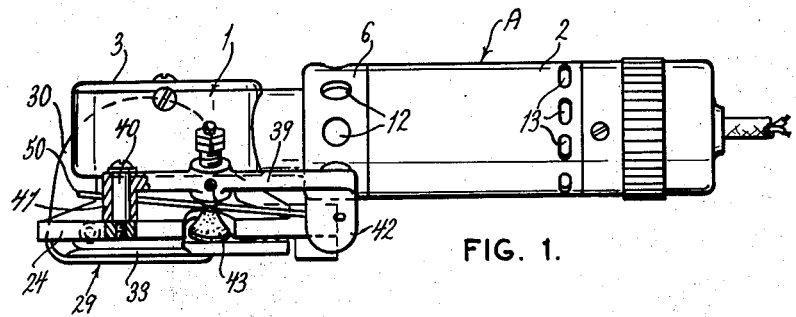
FIG. 1.
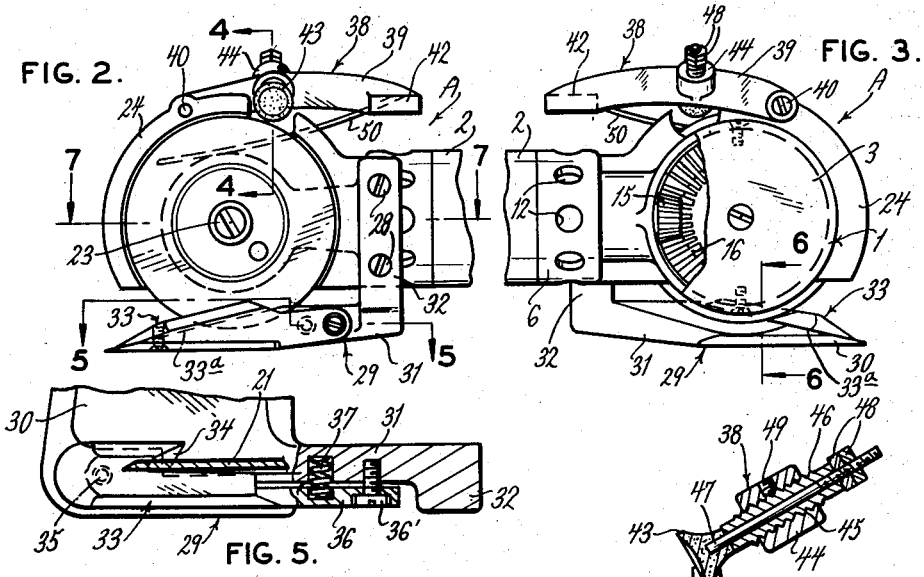
FIG. 2.  FIG. 3.
FIG. 5.
FIG. 6.  FIG. 4.
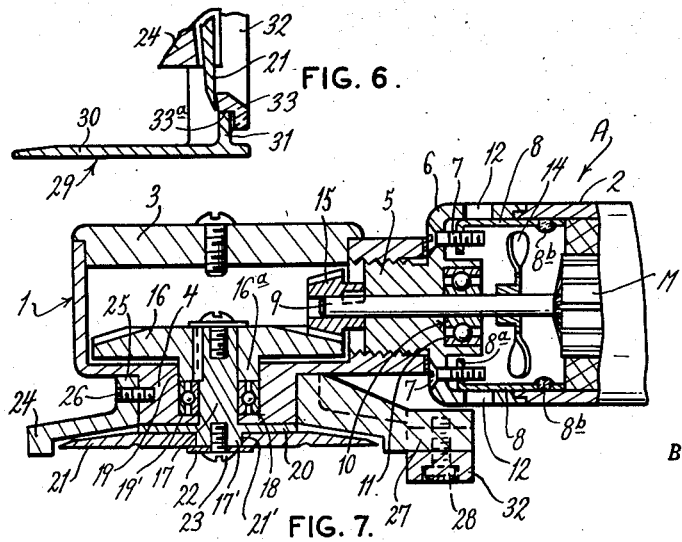
FIG. 7.
INVENTOR.
ALBERT MAESCHER
BY
ATTORNEY United States Patent Office 2,701,911
Patented Feb. 15, 1955

2,701,911

HAND FABRIC CUTTING APPARATUS

Albert Maescher, St. Louis, Mo.

Application November 20, 1952, Serial No. 321,637

4 Claims. (Cl. 30—240)

This invention relates generally to hand cutting apparatus and more specifically to such apparatus which is adapted particularly for use in cutting fabrics arranged in layer formation so that all of the layers of fabric are simultaneously cut during a single operation of the cutting apparatus, the predominant object of the invention being to provide such a cutting apparatus which is of such improved construction and arrangement that it is capable of performing its intended function in an improved and highly efficient manner.

Fig. 1 is a top, plan view of the improved cutting apparatus of this invention, a part of the apparatus being broken away.

Fig. 2 is an enlarged, fragmentary side elevation of a portion of the cutting apparatus shown in Fig. 1.

Fig. 3 is a view similar to Fig. 2 but looking toward the opposite side of the cutting apparatus, and with a part broken away to reveal parts which would be otherwise hidden.

Fig. 4 is an enlarged, fragmentary, vertical section taken on line 4—4 of Fig. 2.

Fig. 5 is a horizontal section taken on line 5—5 of Fig. 2.

Fig. 6 is an enlarged, fragmentary vertical section taken on line 6—6 of Fig. 3.

Fig. 7 is an enlarged, fragmentary longitudinal section taken on line 7—7 of Fig. 2.

In the drawing, wherein is shown for purposes of illustration, merely, one embodiment of the invention, A designates the improved cutting apparatus generally. The cutting apparatus A comprises a head portion 1 from which is extended a hollow handle portion 2. By referring to Fig. 7 it will be noted that the head portion 1 is of substantially cylindrical shape, being closed at one side thereof by a cover plate 3, and being provided at its opposite end with a bearing extension 4 which is of reduced diameter when compared with the diameter of the main body portion of the head portion and projects from a wall thereof. The head portion 1 includes a tubular extension 5 which is internally screwthreaded and this tubular extension receives an externally screwthreaded portion of an end member 6 of the hollow handle 2 of the cutting apparatus A. The end member 6 is secured to the hollow handle 2 through the instrumentality of screws 7 which project through apertures formed through the end wall of the end member 6 and are screwed into screwthreaded openings formed through inwardly extended portions 8a of bracket members 8 which are secured to the wall of the hollow handle by means of fastening devices 8b.

Disposed within the hollow handle 2 of the cutting apparatus A is an electric motor M which is provided with a motor shaft 9, said motor shaft being extended through an opening formed longitudinally through the end member 6 and being supported for rotation by a suitable ball bearing structure 10 which is located in a recess 11 formed in a portion of said end member 6. The end member 6 is provided with openings 12 formed through the wall thereof and the hollow handle has formed through the wall thereof a plurality of openings 13, and these openings serve as inlets and outlets for air which is moved longitudinally of the interior of the hollow handle 2 by a fan 14 (Fig. 7) for cooling the motor M and the handle 2 during use of the cutting apparatus.

Keyed on, or otherwise secured to the motor shaft 9 is a bevel pinion 15 which meshes with a bevel gear 16 that is fixedly mounted on a shaft 17, said shaft being supported for rotation by a ball bearing structure 18 which is disposed in a recess 19 formed in the bearing extension 4 formed on the head portion 1. The ball bearing structure 18 is interposed between a face 19' of the recess 19 and the outer face of a hub portion 16a of the bevel gear 16, and the shaft 17 is provided with an annular flange 20 from which is extended outwardly a shaft portion 17' which is of slightly greater diameter than the main body portion of said shaft 17. Mounted on this shaft portion 17' is a circular, rotary cutting blade 21 having a cutting edge at its circumferential edge, said cutting blade having a central opening 21' through which said shaft portion 17' projects, and said cutting blade contacting with said annular flange 20 of the shaft 17 and being held in place on the shaft portion 17' by a washer 22 which overlaps the central opening 21' of the cutting blade 21 and is held in place by a screw 23 which is screwed into the shaft portion 17'. The cutting edge of the cutting blade is guarded by a guard member 24 which includes a portion 25 that embraces the bearing extension 4 of the head portion 1 and is secured thereto by means of fastening devices 26. The blade guard 24 is provided with a flange which overlies a portion of the cutting edge of the cutting blade, and at one side of said blade guard a portion 27 is provided which serves a purpose to be hereinafter explained.

Secured, by means of screws 28, to the portion 27 of the blade guard 24 is a foot member 29, said foot member comprising a horizontal pressure portion 30 that contacts with the lower layer of the stack of fabric which is to be cut with the aid of the cutting apparatus A. The foot member 29 includes an L-shaped bracket portion which preferably, though not necessarily, is formed integral with said pressure portion 30, there being a horizontal portion 31 which is extended upwardly from the pressure portion 30 and is projected outwardly beyond said pressure portion, and a portion 32 which extends vertically relative to the outer end of said horizontal portion, the latter portion being the portion of the foot structure which is secured by the screws 28 to the portion 27 of the blade guard. By referring to Fig. 2 it will be noted that the portion 31 is provided with an inclined top face 31'.

The foot structure includes an adjustable element 33 a portion of which contacts with the blade in performing a cutting operation. The forward portion of the adjustable element 33 is of rectangular, cross-sectional shape; that is to say, said adjustable element includes a top, horizontally disposed wall 33a which is inclined in accordance with the inclination of the top face of the portion 31 of the foot structure, and the inner face of said horizontal wall 33a contacts with the inclined top face of said portion 31 of the foot structure, and a side wall 33b which contacts with the outer side face of the portion 31 and which is disposed at an approximate right angle with respect to the horizontal wall 33a of the adjustable element. The adjustable element 33 is provided with an inclined notch 34 in which the periphery of the blade 21 rotates, and the forward portion of the adjustable element is secured for slight pivotal movement by a screw 35. At its rear the adjustable element is provided with an extension 36 that has formed in the rear portion thereof an opening which receives the head portion of a screw 36', said screw serving to attach the rear portion of the adjustable element 33 to the portion 31 of the foot structure. Also, alined recesses are formed in the portion 31 of the foot structure and in the rearwardly extended portion 36 of the adjustable element 33 and these recesses provide seats that receive opposite end portions of a coil spring 37.

The cutting apparatus A of this invention includes as a part thereof a blade sharpening means 38 which comprises an arm 39 that is supported by the blade guard 24 for pivotal movement about a pivot element 40 which is screwthreadedly received by a portion of said blade guard. By referring to Fig. 1 it will be noted that the arm 39 is provided at one end thereof with a boss 41 (Fig. 1) which embraces a portion of the pivot element 40, and at its opposite end said arm is provided with a laterally extended thumb piece 42 for actuating the arm pivotally about said pivot element. At a point intermediate the opposite ends thereof the arm 39 supports a sharpening stone 43, said arm being provided with a boss 44 having a screwthreaded opening 45 formed longitudinally therethrough, through which is screwthreadedly extended an externally screwthreaded tubular member 46 (Fig. 4). The sharpening stone 43 is fixedly mounted on a shaft 47 which extends through the bore of the tubular member 46, said sharpening stone contacting with one end face of the tubular member 46 while one of a pair of nuts 48, which are mounted on the screwthreaded end portion of the shaft 47 opposite to the end thereof on which the sharpening stone is mounted, contacts with the other end face of said tubular member 46. A set screw 49 is provided which is disposed in an opening formed in the boss 44 and engages the tubular member 46 so as to prevent undesigned rotation of said tubular member. Also, a spring 50 is provided which is fixed at one end to the thumb piece 42 of the arm 39 and adjacent to its opposite end said spring contacts with the boss portion of the blade guard 24. The spring 50 tends to move the arm in such manner as to maintain the sharpening stone 43 out of contact with respect to the cutting edge of the blade 21 except when it is being used when thumb pressure against the thumb piece will force the sharpening stone against the cutting edge of the blade for a sharpening operation.

The operation of the fabric cutting apparatus of this invention will be clear to a person familiar with the art to which the invention relates, it being plain that the energized motor causes the rotary motor shaft 9 to impart rotary movement to the blade 21 through the instrumentality of the bevel pinion 15 and the bevel gear 16, and the blade of the cutter is passed through the stack of layers of fabric with the pressure portion 30 located beneath said layers of fabric. By referring to Fig. 5 it will be noted that a portion of the adjustable element 33, which forms a part of the foot structure of the cutting apparatus contacts with the blade 21, and for efficient cutting operation this must be so. Therefore as the cutting edge of the blade 21 is ground away, after considerable use of the apparatus it is necessary to reset the adjustable element 33 with respect to the blade and this is accomplished by screwing the screw 36' inwardly so as to move the rear portion of the adjustable element 33 inwardly and compress the coil spring 37 to the required degree for proper contact between a portion of the adjustable element 33 and the blade 21. Finally, it is obvious that the cutting edge of the blade may be resharpened by merely depressing the end portion of the arm 39, which is provided with the thumb piece 42, in a downward direction to bring the sharpening stone into contact with the blade 21 while said blade is rotating. It is to be noted that the tubular element 46 is supported for screwthreaded adjustment with respect to the boss 44 of the arm 39 of the blade sharpening means 38 and this provides for bringing the stone 43 into proper contact with the cutting edge of the blade even after the stone has become worn to some extent.

I claim:

1. A fabric cutting apparatus comprising a head portion, a hollow handle portion extended outwardly from said head portion, an electric motor disposed within said hollow handle portion, a circular cutting blade having a circumferential cutting edge, means for transmitting rotary movement from said electric motor to said circular blade, and a foot structure a part of which underlies a portion of a stack of laminations of fabric being cut with the aid of the cutting apparatus, said foot structure including an element a part of which contacts with the cutting edge of said blade, and means located adjacent to opposite ends of said element for adjustably mounting said element on said foot structure.

2. A fabric cutting apparatus comprising a head portion, a hollow handle portion extended outwardly from said head portion, an electric motor disposed within said hollow handle portion, a circular cutting blade having a circumferential cutting edge, means for transmitting rotary movement from said electric motor to said circular blade, and a foot structure a part of which underlies a portion of a stack of laminations of fabric being cut with the aid of the cutting apparatus, said foot structure including an element a part of which contacts with the cutting edge of said blade, and means for adjustably mounting said element on said foot structure, the last-mentioned means comprising a fastening element for attaching the forward end portion of said adjustable element to a forward portion of said foot structure, and a fastening element for adjustably attaching the rear portion of said adjustable element to a rear portion of said foot structure.

3. A fabric cutting apparatus comprising a head portion, a hollow handle portion extended outwardly from said head portion, an electric motor disposed within said hollow handle portion, a circular cutting blade having a circumferential cutting edge, means for transmitting rotary movement from said electric motor to said circular blade, and a foot structure a part of which underlies a portion of a stack of laminations of fabric being cut with the aid of the cutting apparatus, said foot structure including an element a part of which contacts with the cutting edge of said blade, and means for adjustably mounting said element on said foot structure, the last-mentioned means comprising a fastening element for attaching the forward end portion of said adjustable element to a forward portion of said foot structure, a spring interposed between said adjustable element and an adjacent part of said foot structure, and a fastening element for adjustably attaching the rear portion of said adjustable element to a rear portion of said foot structure.

4. A fabric cutting apparatus comprising a head portion, a hollow handle portion extended outwardly from said head portion, an electric motor disposed within said hollow handle portion, a circular cutting blade having a circumferential cutting edge, means for transmitting rotary movement from said electric motor to said circular blade, and a foot structure a part of which underlies a portion of a stack of laminations of fabric being cut with the aid of the cutting apparatus, said foot structure including an element a part of which contacts with the cutting edge of said blade, and means for adjustably mounting said element on said foot structure, the last-mentioned means comprising a fastening element for attaching the forward end portion of said adjustable element to a forward portion of said foot structure, a coil spring interposed between said adjustable element and an adjacent part of said foot structure, and a fastening element for adjustably attaching the rear portion of said adjustable element to a rear portion of said foot structure.

References Cited in the file of this patent

UNITED STATES PATENTS

| Number | Name | Date |
| --- | --- | --- |
| 616,214 | Underwood | Dec. 20, 1898 |
| 1,191,164 | Edwards | July 18, 1916 |
| 1,514,697 | Gury | Nov. 11, 1924 |
| 1,983,129 | Gury | Dec. 4, 1934 |
| 2,033,939 | Jeppsson | Mar. 17, 1936 |
| 2,294,713 | Boerger | Sept. 1, 1942 |
| 2,360,557 | Friemark | Oct. 17, 1944 |

FOREIGN PATENTS

| 163,176 | Switzerland | Oct. 2, 1933 |